Figure 5:
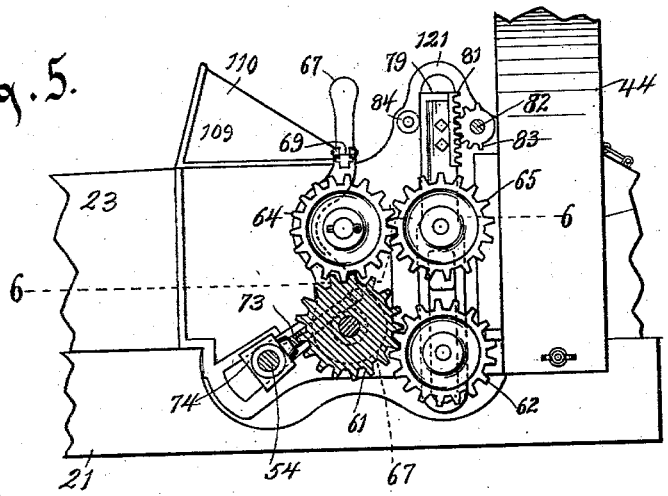

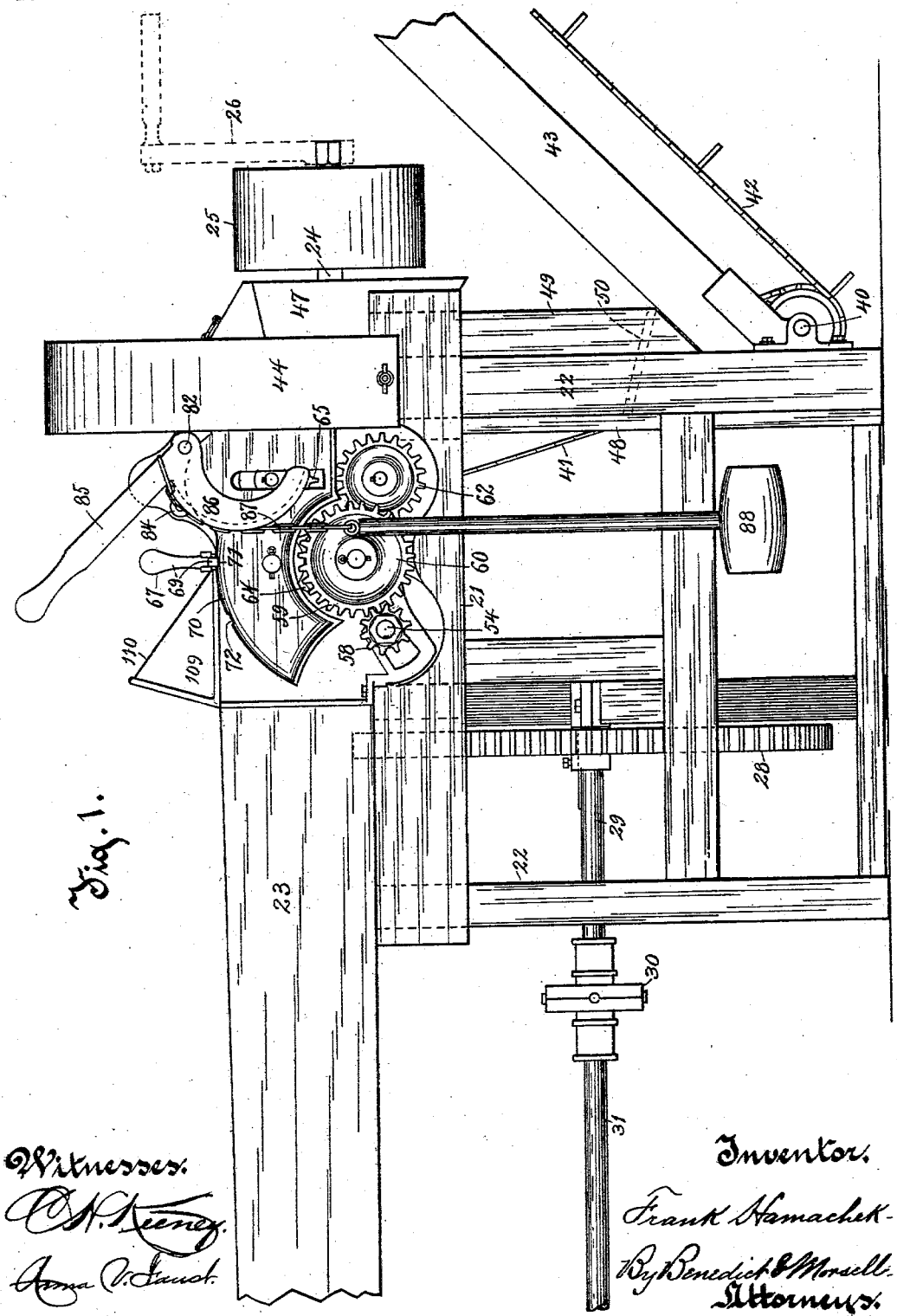

No. 757,614. PATENTED APR. 19, 1904.
F. HAMACHEK.
FEED CUTTER.
APPLICATION FILED SEPT. 5, 1899.
NO MODEL. 7 SHEETS—SHEET 2.
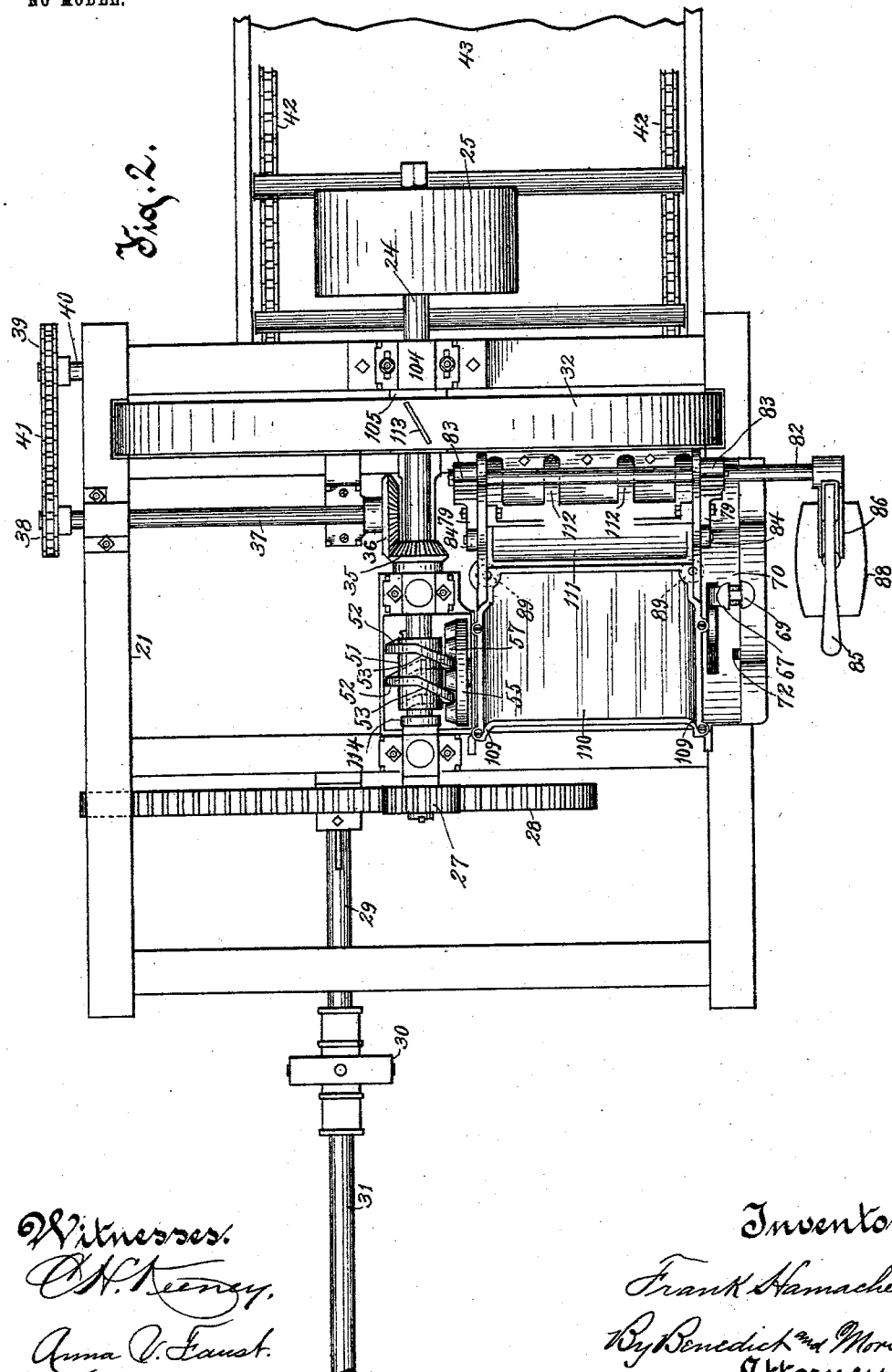
Witnesses.
O. H. Keeney.
Anna V. Faust.
Inventor.
Frank Hamachek.
By Benedict and Morsell
Attorneys.

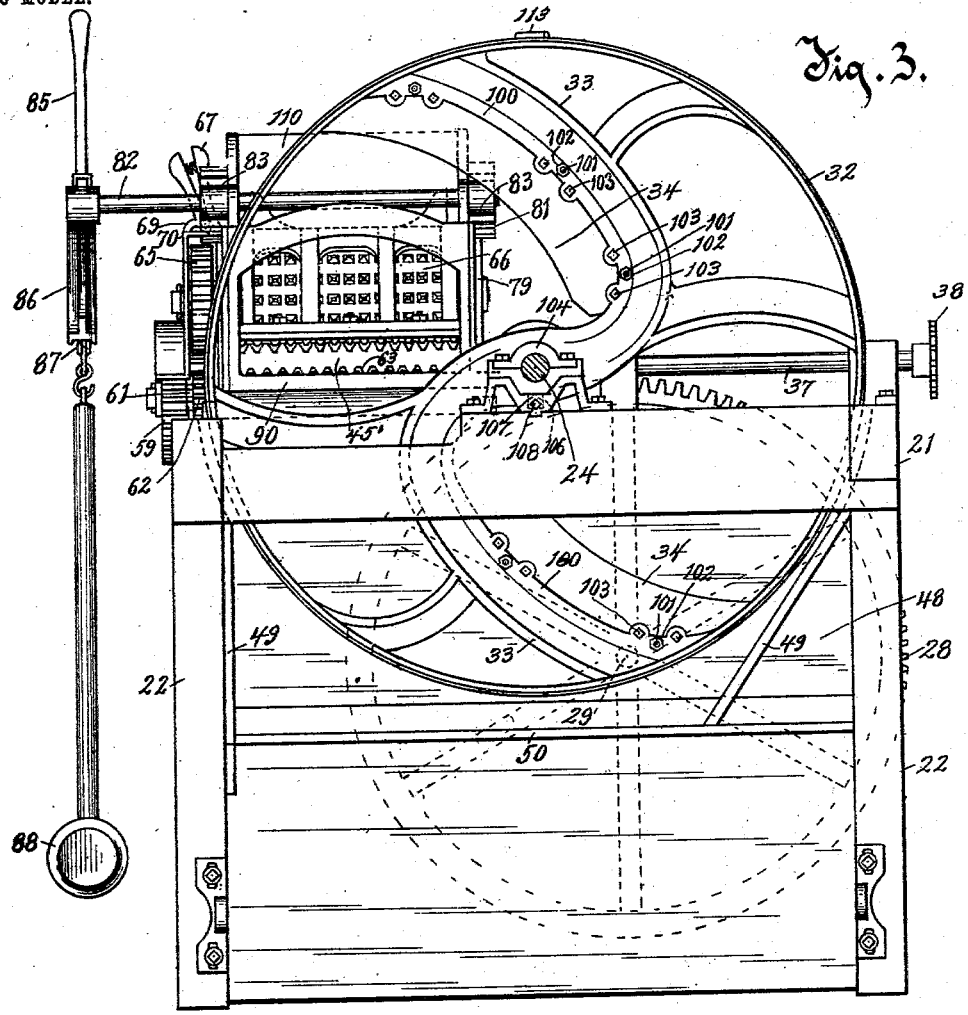
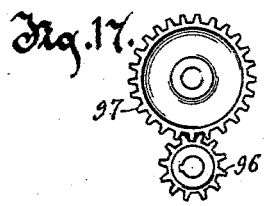
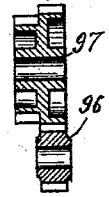
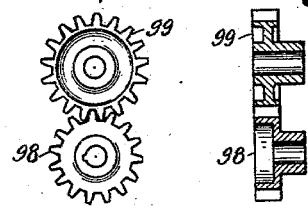

No. 757,614. PATENTED APR. 19, 1904.
F. HAMACHEK.
FEED CUTTER.
APPLICATION FILED SEPT. 5, 1899.
NO MODEL. 7 SHEETS—SHEET 4.
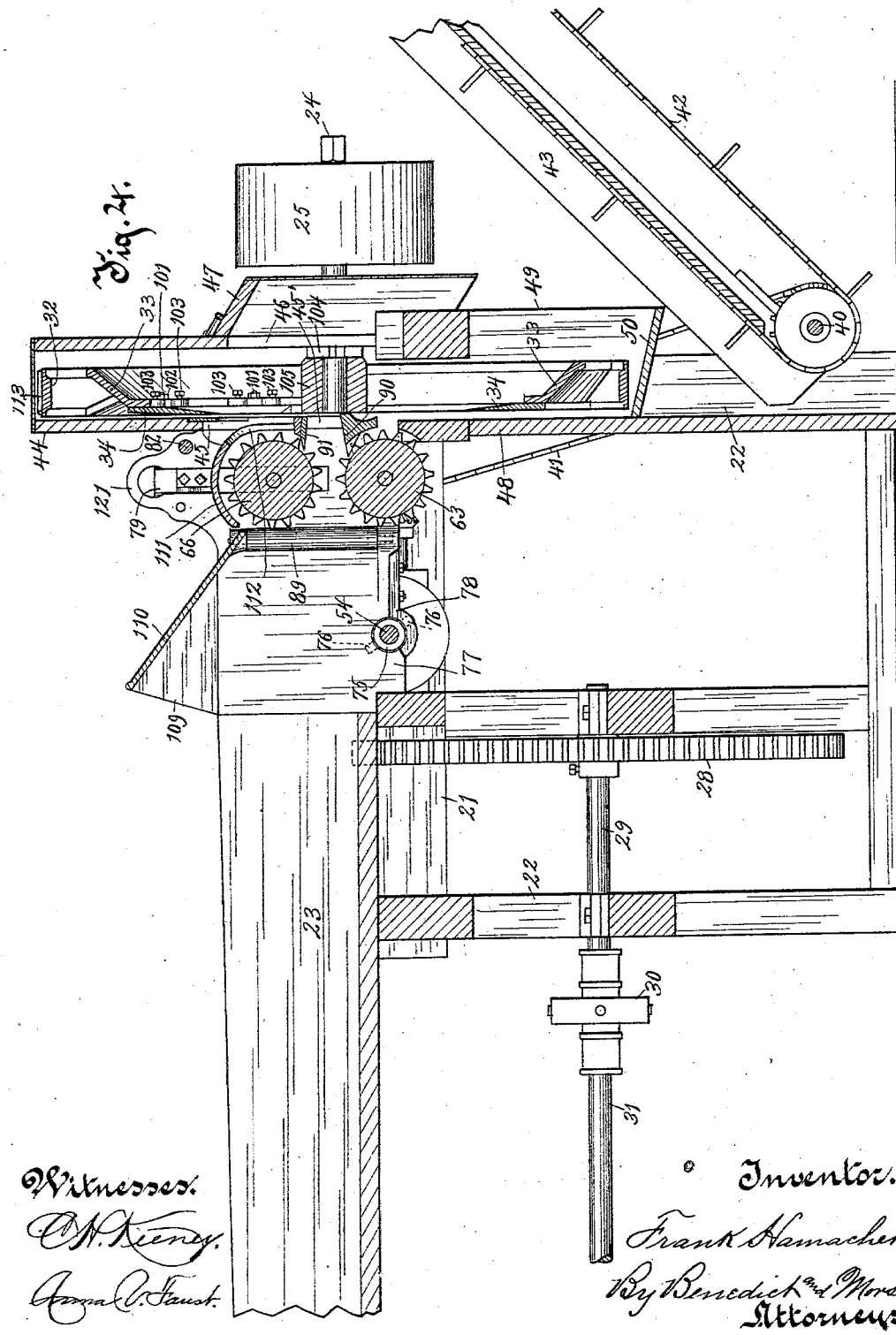

No. 757,614. PATENTED APR. 19, 1904.
F. HAMACHEK.
FEED CUTTER.
APPLICATION FILED SEPT. 5, 1899.
NO MODEL. 7 SHEETS—SHEET 5.

Witnesses:
O. H. Keeney
Anna V. Faust

Inventor:
Frank Hamachek
By Benedict and Morsell
Attorneys

No. 757,614. PATENTED APR. 19, 1904.
F. HAMACHEK.
FEED CUTTER.
APPLICATION FILED SEPT. 5, 1899.
NO MODEL. 7 SHEETS—SHEET 6.
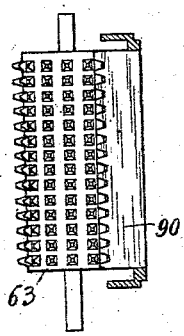
Fig. 8.
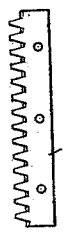
Fig. 9.
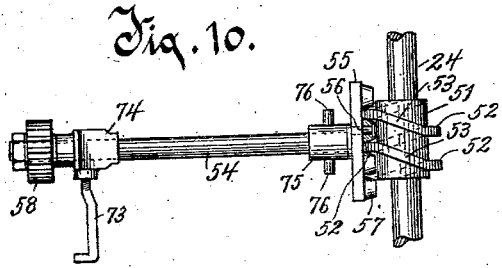
Fig. 10.
Fig. 11.
Fig. 12.
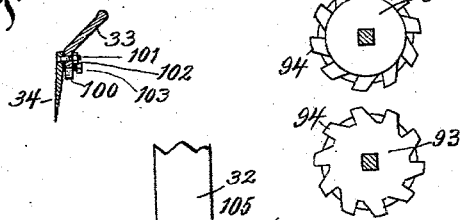
Fig. 14.
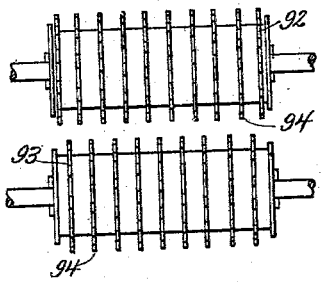
Fig. 15.
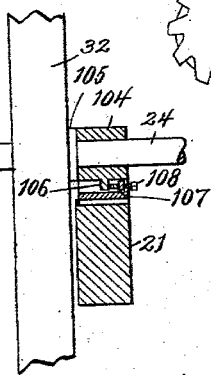
Fig. 13.
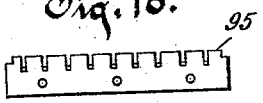
Fig. 16.
Witnesses.
Inventor
Frank Hamachek
By Benedict and Morsell
Attorneys.

No. 757,614. PATENTED APR. 19, 1904.
F. HAMACHEK.
FEED CUTTER.
APPLICATION FILED SEPT. 5, 1899.
NO MODEL. 7 SHEETS—SHEET 7.
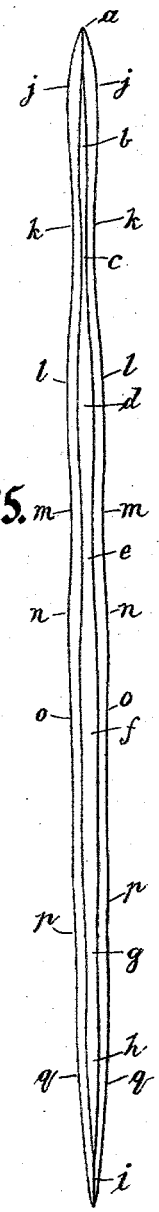
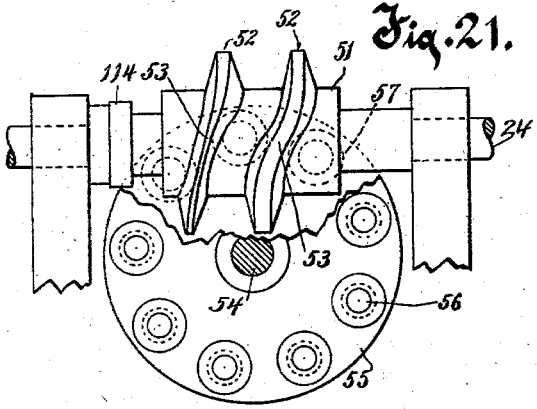
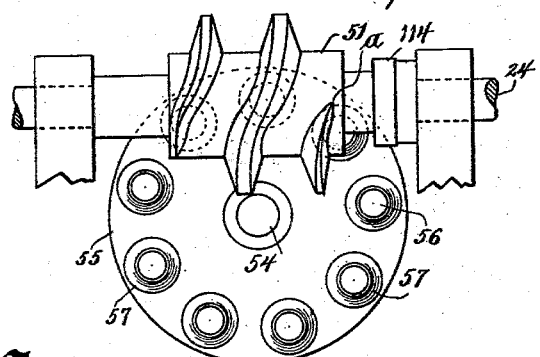
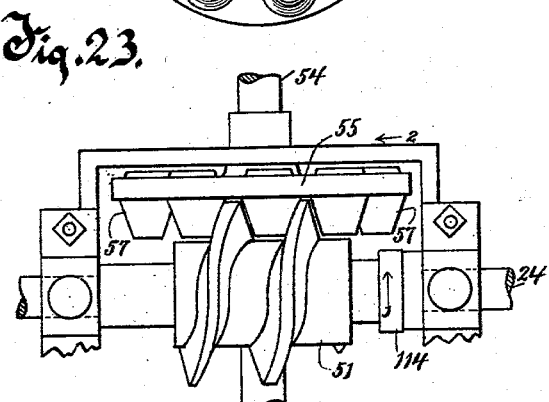
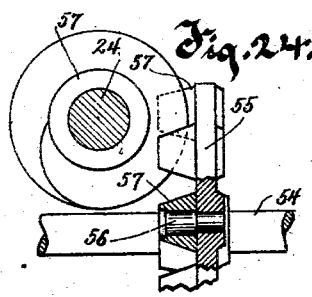
Witnesses.
C. H. Keeney.
Anna F. Schmidtbauer.
Inventor.
Frank Hamachek.
By Benedict & Morsell
Attorneys.

No. 757,614. Patented April 19, 1904.

UNITED STATES PATENT OFFICE.

FRANK HAMACHEK, OF KEWAUNEE, WISCONSIN.

FEED-CUTTER.

SPECIFICATION forming part of Letters Patent No. 757,614, dated April 19, 1904.

Application filed September 5, 1899. Serial No. 729,410. (No model.)

*To all whom it may concern:*

Be it known that I, FRANK HAMACHEK, of Kewaunee, in the county of Kewaunee and State of Wisconsin, have invented a new and useful Improvement in Feed-Cutters, of which the following is a description, reference being had to the accompanying drawings, which are a part of this specification.

My invention relates to improvements in feed-cutters.

The primary object of the invention is to provide a feed-cutter the general construction of which is of such character that the machine will cut a large quantity of material into even feed with the necessity of but a minimum amount of power being required.

A further object resides in the provision of an improved construction whereby the feed is moved forward at intervals and remains at rest during the cutting operation.

A further object resides in the provision of improved form of feed-rollers adapted for shredding the material longitudinally in addition to the cutting of said material transversely by the cutting mechanism.

A further object resides in the provision of improved mechanism for adjusting the space between the feed-rollers.

A further object resides in the provision of an improved means for automatically adjusting the pressure of the feed-rollers in accordance with the amount of material fed between said rollers.

A further object resides in the provision of an improved construction for instantaneously stopping the feeding mechanism whenever desirable or necessary.

With the above and other incidental objects in view the invention consists of the devices and parts or their equivalents, as hereinafter set forth.

Figure 6:
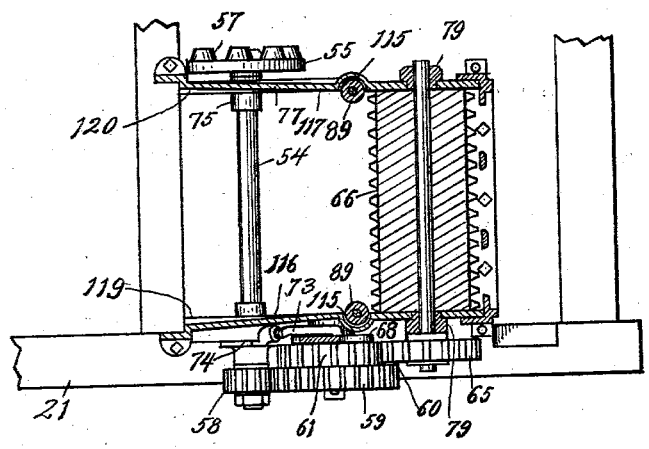
Figure 7:
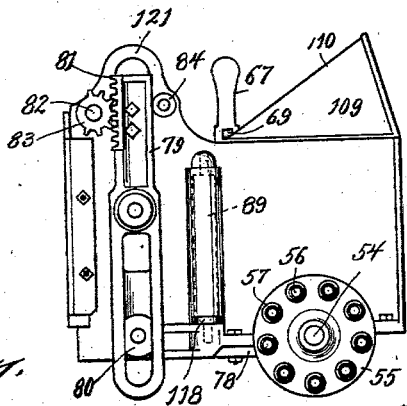

In the accompanying drawings, Figure 1 is a side elevation of the machine, showing in dotted lines a crank for operating the machine by hand-power. Fig. 2 is a plan view of Fig. 1 with the hand-crank and other parts removed. Fig. 3 is an elevation of one end of the machine, the covering of the cutting-wheel being removed. Fig. 4 is a longitudinal sectional view of the machine on a plane through the feeding-rolls. Fig. 5 is a side view of a fragment of the upper portion of the machine with the casing removed, a part of one of the train of gears removed, and the shaft 54 in section and its pinion removed. Fig. 6 is a section on the line 6 6 of Fig. 5. Fig. 7 is a view of the side opposite to that shown in Fig. 5. Fig. 8 is a detail view of the lower feed-roller of one form of roller and showing its guard-plate adjacent thereto. Fig. 9 is a detail view of the removable guard-plate for the upper roller of the form shown in Fig. 8. Fig. 10 is a detail view of the feed-regulating mechanism. Fig. 11 is a view of one of the slide-bars. Fig. 12 is a cross-section of a cutting-knife and one of the spokes of the cutting-wheel. Fig. 13 is a detail view of the means for adjusting the cutting-wheel longitudinally, parts being in section. Fig. 14 illustrates end views of a modified form of feeding-rollers which are adapted also for shredding the material. Fig. 15 is a view of the two rollers shown in Fig. 14 at right angles to Fig. 14. Fig. 16 is a detail view of the removable guard-plate of the upper roller of Fig. 15. Fig. 17 illustrates the gearing for producing a medium cut. Fig. 18 is a central section through Fig. 17. Fig. 19 illustrates the gears for producing a long cut. Fig. 20 is a central section through the gears shown in Fig. 19. Fig. 21 is a side elevation of the worm-gearing looking upon the side of the disk opposite to the side from which the conical rollers project and showing the upper portion of the disk broken away, the broken-away portion being carried out in dotted lines. Fig. 22 is a side elevation looking on the face of the disk from which the conical rollers project. Fig. 23 is a plan view of Fig. 22. Fig. 24 is a cross-section through the shaft 24 and looking on the edge of the disk, a portion of said disk being broken away; and Fig. 25 is a detail view showing the ribs or guides removed from the hub of the worm and straightened out, so as to clearly illustrate the variations in the thicknesses of said ribs or guides both at the outer edge and at the base thereof.

The frame of the machine may be of any desired form best adapted for supporting the working parts of the device. In the present illustration of my invention I have designated the upper portion of the frame by the numeral 21, the supporting legs or standards by the numeral 22, and the feeding-trough by the numeral 23.

Mounted in suitable bearings in the upper portion of the frame is a main shaft 24. Upon this shaft is mounted a pulley 25, around which a belt (not shown) is passed, said belt leading to any suitable source of power and adapted for rotating the main shaft. Whenever the machine is desired to be operated by hand-power, a hand-crank 26 (shown in dotted lines in Fig. 1) may be applied to one end of said shaft. If instead of operating the machine by belt or by hand power it is desired to operate the same by some other ordinary form of motive power—such, for instance, as horse-power—one end of the shaft 24 may be provided with a cog-wheel 27, which wheel is adapted to be engaged by a larger cog-wheel 28, mounted on a shaft 29. The outer end of shaft 29 has connected thereto by a universal joint 30 another shaft 31, which latter shaft is adapted to be rotated by the motive power referred to. The cog-wheel 28 is slidingly mounted on the shaft 29, so that when the machine is operated by belt-power or by hand-power said cog-wheel may be slid out of engagement with the small cog-wheel 27, and thereby adapt itself to engage any other machinery that may be mounted on the same feed-cutter frame.

Mounted fast on the main shaft 24 is a cutter, preferably in the form of a wheel 32 and having a series of arch-shaped spokes 33 radiating from the hub thereof and extending to and connecting with the rim of the wheel. To these upwardly-curved and outwardly-arch-shaped spokes are connected curved cutting blades or knives 34. This arch-shaped form of the spokes is not only desirable from the fact that spokes so constructed serve to strengthen the entire wheel and form a firm and rigid bed for the knives, but they also produce a fanning operation—that is to say, they act to discharge and fan the material as it is being cut. In machines in which the spokes of the cutting-wheel are straight or square-ribbed said spokes have a tendency to fan the material inwardly into the casing or wheel-cover, and thereby prevent a free discharge. It is of course obvious that any desired number of spokes 33 and cutting-knives 34 may be provided. The main shaft has also mounted thereon a bevel-gear 35, which meshes with another bevel-gear 36 on the inner end of a transversely-arranged shaft 37. The outer end of this shaft carries a sprocket-wheel 38, which is connected to a sprocket-wheel 39, carried on the outer end of a shaft 40 of an elevator by means of a sprocket-chain 41. The shaft 40 has also mounted thereon two sprocket-wheels, around which conveyer-chains 42 pass, said chains forming the actuating means for an ordinary form of endless elevator 43.

The upper portion of the cutting-wheel is preferably covered by an arch-shaped hood 44. Spaces are left below the lower edges of the side pieces of this hood, one of said spaces forming an inner opening 45 and the other space an outer discharge-opening 46. Fitted over this discharge-opening is a spout 47, which directs the cut material on to the elevator 43. This spout is preferably removably secured in place by means of a hook-and-eye connection. A lower hood or box is also provided for the cutting-wheel, said hood or box having an open outer side and comprising the rear board 48, the two side boards 49, and the inclined bottom board 50, which bottom board also directs the cut material on to the elevator 43. The special worm-gearing which is used in connection therewith is shown most clearly on Sheets 2, 6, and 7 of the drawings. Referring particularly to this mechanism, the shaft 24 has fitted thereon or integral therewith a sleeve 51. If desired, instead of mounting a sleeve, such as 51, on the shaft said shaft may be formed with an enlargement. The sleeve has formed spirally therearound outwardly-projecting ribs or guides. The ribs or guides at certain points have parallel portions 52 52, which describe an arc of a circle of which the shaft is the center or axis, while other parallel portions of the ribs or guides are on diagonal lines with respect to the shaft or axis 24 and as indicated by the numerals 53 53. The sleeve and its projecting ribs form a regulating worm-wheel. The sleeve is not absolutely essential, inasmuch as the ribs or guides could extend directly around the shaft. The sleeve, however, is advisably employed, inasmuch as it forms the hub of the worm-wheel. Mounted in bearings in the sides of the head is a shaft 54, which shaft extends in a direction at an angle to the shaft 24. Upon this shaft 54 is mounted a wheel or disk 55. The face of this disk nearest to the worm has extending circularly therearound a series of conical projections 56, upon which are mounted conical rollers 57. The shape of the rollers is such that if the cones were continued toward the shaft 24 the points of said cones would meet the center of the shaft. The angle of each conical roller corresponds to the angle or bevel of the guides or ribs of the worm notwithstanding the changing positions which the rollers assume in the rotation of the disk. In order to clearly illustrate this principle of the invention, particular reference is made to Fig. 25 of the drawings, wherein the ribs or guides are removed from the sleeve and straightened out into a continuous rib. Before attempting to explain specifically the construction of the ribs or guides attention is directed to the fact that the nearer any two of the rollers in the rotation of the disk are brought toward an upper position or toward a horizontal plane the greater will be the space afforded between the rollers for the accommodation of the ribs or guides, and as the rollers in the rotation of the disk are carried away from the upper position, in which they are in an approximately horizontal plane, the less will be the space presented for the accommodation of the ribs or guides. Now if the ribs or guides were of a uniform thickness or of a uniform taper it is apparent that under the changing positions of the rollers said ribs or guides would either fit too loose or too tight in the spaces between the rollers or possibly might be so wide as to be absolutely prevented from entering between the rollers. The result of such conditions would be either an entirely inoperative device or else a device wherein an uneven rotation would be imparted to the disk and wherein also considerable friction as well as play or rattle would be present. To avoid these difficulties, it is necessary not only to construct the ribs or guides beveled in order to correspond to the beveled rollers, but also to construct them of varying thicknesses, both at the base and at the outer edge thereof. Referring particularly to Fig. 25 for a clear elucidation of this construction, and beginning at the point $a$, and which point is clearly shown in Fig. 22, it will be seen that the rib or guide at $a$ is pointed or tapered, and this pointed edge affords opportunity for the rib or guide to initially and freely engage one of the conical rollers, it being understood that the initial engagement occurs when the roller which is engaged is out of the extreme upper position, and consequently there is but a small space for the entrance of the rib. Now referring particularly to the variations in the thicknesses of the outer edge of the rib, it will be seen that beginning with the point $a$ said outer edge gradually widens, as indicated by the letter $b$. This widened portion is followed by a very narrow portion $c$, which merges into a wider portion $d$, which portion $d$ is followed by a narrow portion $e$, said narrow portion $e$ merging into a wide portion $f$, said wide portion $f$ merging into a more narrow portion $g$ and said portion $g$ followed by a slightly-wider portion $h$, which portion $h$ tapers and merges into the tapered and terminal end edge $i$. Referring to the variations in thicknesses at the base of the ribs or projections, said base from the end tapered edge $a$ for a short distance is somewhat wide, as indicated by the letters $j\ j$. These wide portions merge into narrower base edges $k\ k$, which in turn merge into wider base edges $l\ l$, followed by narrower base edges $m\ m$, which latter merge into slightly-wider edges $n\ n$, which edges are followed by narrower edges $o\ o$, and said edges $o\ o$ are followed by still narrower edges $p\ p$, and finally said edges $p\ p$ merge into slightly-wider base edges $q\ q$, which edges $q$ taper to the tapered edge $i$.

It will be understood that the outer edge of the ribs or guides must be of the varying thicknesses described in order to adapt them to engage in the spaces between the conical rollers under all conditions and to bear evenly and truly against the face of the roller against which it is acting. This is most clearly shown in Fig. 21, wherein one portion of the rib or guide is between two of the rollers in which parallel vertical lines drawn through their axes are close together, and consequently thin portions of the ribs or guides are required to enable said ribs or guides to fit the space, and wherein another portion of the ribs or guides is between two rollers in which parallel vertical lines through their axes are farther apart, and consequently said space will accommodate a thicker portion of the ribs or guides. It will also be evident that as the rollers are beveled there must be variations in the thicknesses of the base of the ribs or guides, as hereinbefore described, so that said rollers may bear evenly against the entire side of the rib or guide during the entire time the roller is in bearing contact or engagement, even when said roller travels from the upper position down and away from said upper portion.

From the construction of the worm-gearing above described it will be seen that I present a device wherein there are two rollers always in bearing contact with the ribs and that the shape of the ribs is such that a full and complete bearing contact of the roller with the rib is maintained during the entire period of engagement, and hence excessive friction is prevented and even rotation is imparted to the disk carrying the conical rollers and all play and backlash thereby prevented. The worm-gearing is designed to impart an intermittent rotation to the disk, and hence an intermittent feed of the material, and this is accomplished by the provision of the portions 52 52 of the ribs, which encircle the sleeve in an arc of a circle of which the shaft 24 is the center or axis. When the shaft 24 is rotated in the direction of the arrow 1 in Fig. 23, the disk of course will be rotated in the direction of the arrow 2, Fig. 23.

On the outer end of the shaft 54 is a pinion 58. This pinion engages the outer teeth 59 of a double wheel 60, the inner teeth 61 of said gear-wheel describing a circle of less circumference than the circle of the outer teeth, and said inner teeth engage the teeth of a gear-wheel 62, mounted on the shaft or axis of the lower feed-roller 63, which is shown in Figs. 3, 4, and 8. The inner teeth 61 also engage another gear-wheel 64, said gear-wheel 64 in turn engaging the teeth of a gear-wheel 65, mounted on the shaft or axis of an upper feed-roller 66, said feed-roller being shown in Figs. 3, 4, and 6. The feed-rollers 63 and 66 are formed or provided with conical projections which are arranged lengthwise of and around said rollers and are adapted to grasp and pull the material between the rollers.

In order to provide for throwing the pinion 58 out of mesh with the teeth 59 of the double gear-wheel 60, and thereby stopping the feeding of the material, if such becomes necessary by reason of some hard substance getting in between the rollers or for any other reason, I provide a lever 67, which at its lower end is formed with a ring 68, said ring surrounding the hub of the shaft or axis of the gear-wheel 60, said hub of the shaft or axis thereby forming a pivot for the lever. The upper end of the lever has pivoted thereto a spring-actuated dog or pawl 69. When the lever is moved, the dog is adapted to ride over a segment 70 and to engage either of the notches 71 or 72, arranged in the upper edge of said segment. The lever 67 is engaged near its lower end by the hooked extremity of a rod 73, and the opposite extremity of said rod is so connected that when the dog is disengaged from the notch 71 and the lever moved in one direction a push is exerted on the shaft 54 sufficient to cause the teeth of the pinion 58 to disengage from the outer teeth of the double gear-wheel 60. The lever is maintained in this position by permitting the dog 69 to engage the notch 72 of the segment. In order to provide against excessive friction, which would be occasioned by the movement described of the shaft 54, I prefer to arrange the bearings of said shaft in a peculiar manner. These bearings are in the form of sleeves loosely surrounding the shaft, one of said bearings being indicated by the numeral 74 and the other by the numeral 75. The bearing 74, located in a side casting 77', is provided with an interiorly-threaded boss, which boss is engaged by the threaded extremity of the rod 73, and the other bearing, 75, for the opposite end of the shaft, and located in a side casting 77, is provided with two projecting studs or pivots 76 76, (see particularly Fig. 10,) extending in a horizontal plane with respect to the movement of the shaft. These studs or pivots fit in suitable recesses provided therefor, and thereby form a pivotal connection for the bearing 75 and permitting the opposite end of the shaft carrying the pinion 58 to be swung without causing friction on the portion of the shaft which passes through the bearing 75. The recesses for these pivot-studs or pintles are shown most clearly in Fig. 4, one of said recesses being formed in the side casting 77 and the other in a bracket 78, bolted to the lower edge of the side casting 77. It is also to be noted that by having a threaded connection between the rod 73 and the bearing 74 if at any time there is any wear between the pinion 58 and the outer teeth of the double gear-wheel 60 this can readily be taken up merely by disengaging the lever 67 from the rod 73 and then moving said rod until the pinion and the gear referred to properly mesh with each other. In order that the lever may make the proper throw, so as to disengage the pinion 58 from the double gear-wheel 60, all that is necessary to be done is to press upon the handle portion of the dog 69, and thereby compress the spring which is located between said dog and the handle portion of the lever. This releases the dog from engagement with the notch 71, and the moment this disengagement occurs the force of the gearing will cause the lever to swing over toward the notch 72 without the necessity of swinging the lever by hand, and when the notch 72 is reached by the dog 69 said dog will automatically engage the notch. This arrangement possesses quite an advantage, inasmuch as should any hard substance get in between the feed-rollers rotation of the feed-rollers can be instantly stopped merely by hand-pressure on the dog, the lever itself being swung automatically in a direction to disengage the gearing by the force of the gears.

The journals or ends of the shaft or axis of the upper feed-roller 66 are mounted in slide-bars 79, said bars working in suitable guideways provided therefor in the sides of the frame. These slide-bars are formed with elongated slots, (see particularly Fig. 7,) in which projecting bosses 80 from the sides of the frame extend and form guides for the slides. The journals or ends of the shaft or axis of the lower feed-roller are mounted in these bosses. It is obvious that as the slide-bars are raised or lowered the upper feed-roller is raised or lowered therewith, while the lower feed-roller remains in a fixed position. By this arrangement the width of the space between the two rollers may be conveniently regulated, so as to provide for a greater or less amount of material being feed between the rollers. As a convenient means for raising or lowering the slide-bars I show said bars as provided with series of teeth forming racks 81. A transverse rock-shaft 82 is mounted in suitable bearings in the sides of the frame, said shaft carrying two mutilated pinions 83, which pinions are so positioned on the shaft as to engage the racks 81. The racks are held in engagement with the pinions by means of rollers 84 pressing against the untoothed edge of the slide-bars, said rollers also permitting the rack-bars to move with as little friction as possible. The shaft 82 may be turned by means of a lever 85 extending therefrom. This construction permits the ends of the upper roller to be raised and lowered the same height, and material is thereby always fed evenly between the rollers.

An important feature of my invention is the provision of means for automatically regulating the pressure of the rollers on the material according to the quantity of material fed. This means consists in providing the shaft 82 with a depending curved arm 86, said curved arm being in the form of a segment of a circle with the curve toward the trough side of the machine. Suitably secured at its upper end and extending around in the groove of the curved edge of the arm 86 is a chain 87 or other suitable flexible device, and to the free end of this chain is connected a weight 88. For convenience I prefer that this weight should be in the form of a mallet consisting of the lower headed portion and the upwardly-extending handle, said handle being disconnectedly secured to the chain by means of a hook-and-eye connection, whereby whenever it is desired to use the mallet it can be readily disconnected from the chain and then subsequently again properly connected thereto. In this class of machines it is necessary to transport a machine from one place to another, and when properly positioned at the place where it is desired to operate the machine it is essential that the framework should be securely connected to a suitable bed. Heretofore it has been necessary to carry from one place to another a heavy mallet for fastening down the framework to the supporting-bed, as well as fastening the horse-power, engine, or other motor. By the provision of the weight 88, however, in the form of a mallet this inconvenience is rendered entirely unnecessary.

In the operation of the automatic form of adjustment just described when a small quantity of material is passing between the rollers the weight exerts a pull on the chain 87, and said chain will cause a rocking of the shaft 82 in a direction to cause a descent of the upper feed-roller, and consequently a pressure of said roller on the material. By this movement of the curved arm said arm is turned in a direction to permit the weight to assume a position near the center or axis of turning, and consequently but a limited pressure is exerted by the upper feed-roller on the material, it being understood that when but a small quantity of material is passing between the feed-rollers only a limited pressure is necessary. When, however, an augmented quantity of material is fed between the rollers, the upper roller is raised against the resistance of the weight 88, and the segmental arm 86 is then turned in a direction to carry the weight 88 farther away from the center or axis of turning, whereby said weight causes a great pressure of the upper roller on the material, the pressure increasing as the amount of material fed between the rollers is increased.

In the accompanying illustration of my invention I have shown the curved arm 86 as forming an integral part of the lever 85. This is not absolutely necessary and is only done as a matter of convenience, as it is obvious that the curved arm may be entirely separate from the lever. The lever itself of course can be omitted altogether, if desired. While, as stated, this lever may be omitted, yet I prefer to employ the same, inasmuch as by the employment thereof in connection with the curved arm 86 and the weight 88 it is in the power of the operator at any time to raise the upper roller by simply manipulating said lever. When the upper roller is thus raised, the operator is enabled to pull back the material when hard substances get in between the rollers. The lever also enables a greater pressure to be put on the upper roller merely by exerting a slight pressure on the lever than it is possible to secure by the weight alone.

It will be obvious that when the material passing between the rollers is crowded down by the upper feed-roller a pressure is necessarily produced by the material against the sides of the machine, thereby occasioning considerable friction and preventing the free movement of the material. In order to provide against this, I employ two perpendicular rollers 89 on opposite sides of the feed-space. These rollers of course necessarily reduce this retarding friction to the minimum.

For each feed-roller a guard-plate is provided, said guard-plate adapted to prevent the projections on the roller from carrying the material around with the rollers. Fig. 8 illustrates, in connection with the lower feed-roller 63, the particular guard-plate therefor, said plate being indicated by the numeral 90 and being preferably a part of the frame forming a ledger-plate or steel against which the knives shear or cut off the material. The edge of this guard-plate which is adjacent to the feed-roller is provided with a series of slits, said slitted edge being preferably chill-hardened. The slits permit the projections of the roller to pass therethrough as the roller revolves, and the guard-plate acts to prevent the material from being carried around with the rollers. The guard-plate for the upper roller 66 is illustrated in Fig. 9 and is indicated by the numeral 91. It is similar in construction to the guard-plate 90, excepting that it preferably consists of a separate plate bolted or otherwise secured in the manner hereinafter more fully pointed out.

In Figs. 14 and 15 of the drawings I have shown other forms of feed-rollers which may be substituted for the feed-rollers 63 and 66, hereinbefore described. The said rollers 63 and 66 are intended more especially for grasping the material and pulling it into the space between the rollers and are particularly designed for feeding fodder-corn. The rollers in Figs. 14 and 15, however, are more especially intended for fodder, although, if desired, they may also be used for ensilage, straw, &c. The upper of these rollers is indicated by the numeral 92 and the lower one by the numeral 93. These rollers have arranged therearound knives 94, which are designed to shred or cut the fodder-corn or other material lengthwise. The knives are annular in shape and are preferably clamped between blocks mounted on the shafts or axes of said rollers.

In Fig. 16 is shown the guard-plate for the upper roller 92, Figs. 14 and 15. This guard-plate is indicated by the numeral 95 and is preferably removably secured by means of bolts or other suitable devices, as is the case with the guard-plate 91, Fig. 9, and is similar to the guard-plates 90 and 91, except that the slits are straight instead of being of conical form. The guard-plate for the lower roller 93 is not shown, but it is exactly similar to the construction of the guard-plate 95, excepting that it preferably forms a rigid part of the head-frame and is in the nature of a ledger-plate or steel similar to 90.

In Figs. 17 to 20, inclusive, I show pinions and gears which are adapted to be substituted for the pinion 58 and the gear-wheel 60. (Shown in the other figures of the drawings.) By providing for interchangeability of the pinions and gears greater or less lengths of cut of material may be secured. The pinion 58 and the gear-wheel 60 provide for a small length of cut. In Figs. 17 and 18 are shown a pinion 96 and a gear-wheel 97, said gear-wheel having the inner and outer teeth, the same as the gear-wheel 60. This size of pinion and gear-wheel provide for a medium cut. In Figs. 19 and 20 I show a pinion and gear of a size to provide for a long cut. The pinion of Figs. 19 and 20 is indicated by the numeral 98 and the gear-wheel by the numeral 99. In the case of the gear-wheel 99 it is not necessary that it should be provided with inner and outer teeth, inasmuch as the toothed periphery of said gear-wheel is of the same circumference as the gear-wheel 62.

In Fig. 12 of the drawings I have shown a means for adjusting the cutting-blades 34 so that the cutting edges of said blades may be adjusted closer to the ledger-plate 90 in order to obtain a proper shear cut. From this figure it will be seen that each spoke is formed with an angularly bent or flanged portion 100, and to this flange the blade is held by means of bolts 101, said bolts being provided with threaded ends to receive nuts 102. Adjusting-screws 103 pass through the flange 100 and press against the blade. In order to adjust the cutting edge of the blade, all that is necessary to be done is to loosen the nuts 102 and then turn the screws 103 in the proper direction, in accordance with whether it is desired to adjust the cutting edges inward or outward. When the proper adjustment is obtained, the nuts 102 are again tightened and the blades thereby held to adjusted position. By referring to Fig. 3 it will be noticed that the flanged portion 100 is wider at the ends of the spokes 33, thereby forming a wider and firmer bed for the blades 34. The holes through the blades for bolts 101 are bored farther away from the back of the blade than for the screws 103, making the line of rigidity through the center of the blade and yet not interfering with the cutting capacity.

In Fig. 13 I show an adjustable bearing-box for the shaft 24. This box is indicated by the numeral 104 and abuts against the hub 105 of the cutting-wheel 32. The under side of the bearing-box is provided with a downwardly-extending lug 106. The bridgework is provided with an upwardly-extending wall 107, and through this wall passes a set-screw 108, said set-screw bearing at its inner end against the downwardly-extending lug 106. By this construction should any wear occur between the bearing-box and the hub 105 of the cutting-wheel the box 104 may be readily adjusted merely by loosening the two bolts passing through the box, (said bolts being shown in Fig. 2,) and by then turning the set-screw 108 the very slightest play may be thereby compensated for, and the cutting-wheel, which is of course fast on the main shaft 24, is thereby effectually prevented from having any end play between hub 105 and a collar 114, said collar being shown clearly in Fig. 2.

Another feature of my invention is the peculiar construction of the throat which leads to the feed-rollers. This throat is formed by two upwardly-extending side pieces 109, which are connected by a top piece 110, said side pieces and the top piece being arranged on a gradual declination toward the feed-rollers. By this arrangement not only is a throat formed which gradually converges toward the feed-roller, but at the same time the top piece 110 forms the upper bearings for the perpendicular rollers 89.

Another incidental feature of my invention is the provision of a hood 111, arranged over the upper feed-roller 66. The slide-bars 79 are connected to this hood, with the result that when the slide-bars are moved said hood is moved therewith. The hood is formed or provided with depending fingers 112, the lower ends of said fingers extending to and connecting with the guard-plate 91 or the guard-plate 95, as the case may be. The slide-bars, the upper roller 66, the hood, and the guard-plate 91 or 95 therefore move together, and said guard-plate thereby always occupies the same relative position with respect to the feed-roller 66.

Attention is also directed to the fact that the peripheral rim of the cutting-wheel 32 is advisably provided with a diagonal rib 113, preferably of steel. (See Fig. 2.) This rib serves the purpose of clearing the cover or hood or other portion of the frame within which the wheel rotates of any light material which might be carried there by the rim of wheel 32.

The operation of my machine is as follows: When the main shaft 24 is rotated by any of the means hereinbefore described, movement is imparted to the elevator 43 by means of the intermeshing of the gears 35 and 36 and by means of the other connections running to said elevator. The rotation of the shaft 24 will also of course cause a rotation of the feed-regulator. As soon as the conically-shaped rollers or sleeves of the wheel or disk 55 are acted upon by the diagonal portions 53 of the ribs or guides of the feed-regulator said wheel 55 is turned and the shaft 54 and its pinion 58 also thereby turned. The rotation of the pinion 58 will be imparted to the double gear-wheel 60, and this double gear-wheel in turn, through the gears 62, 64, and 65, will impart rotation to the feed-rollers and the material thereby caused to be fed between said feed-rollers and through the opening 45'. The moment the feed-regulator has been rotated a sufficient distance to bring the portions 52 of the ribs or guides into engagement with the conical rollers or teeth of the wheel 55 rotation of said wheel will cease, and consequently the feeding of the material will be stopped. When this cessation of the feeding occurs, the shaft 24 will have been rotated a sufficient distance to bring a cutting blade or knife of the cutting-wheel into action, and this cutting blade or knife will cut transversely across the material which has been fed through the opening 45', formed in the frame, and the arch-shaped spokes will then assist by the fanning operation described in forcing the cut material through the discharge-opening 46 into the spout 47 and onto the elevator 43, by which elevator it is taken to the place of deposit. The bottom board 50 prevents cut material from falling below the elevator 43. With the continued rotation of the shaft 24 the diagonal portions 53 of the ribs or guides of the feed-regulator are again brought into engagement with the conical rollers of the wheel 55 and the feeding is again resumed, and the same operation as described is repeated.

In Figs. 6 and 7 are illustrations of the vertical rollers 89, heretofore referred to. These rollers 89 are located within circular recesses 115 115 in the sides 77 77' of the head-frame. At the bottom of each recess 115 is an opening 118 to allow any dust which might drop in between the rollers 89 and the walls of the recesses 115 to freely drop out.

It is obvious that the side frames 77 77' are so constructed as to receive all the parts of the feed-cutter frame in a compact form, so that all these parts can be mounted or placed in position collectively, in which case it forms the feed-cutter head complete, which I claim is a great advantage in the construction of the machine. The sides 77 77' are so constructed as to contain bearings for the lower feed-roller and also bearings for the vertical rollers 89. These side pieces also receive boxes or bearings for shaft 54 and are provided with bosses or studs for double gear 60 and 61, as well as bosses for the shaft of the idler-wheel 64. It will be noticed that the outstanding hub or boss to receive the shaft of the gear 60 and 61 is reduced toward the wheel end, so as to receive the pawl-lever 67. The side pieces 77 77' also have projections 119 and 120 to receive a supporting-plate. (Not shown in the drawings.) One of the side pieces also receives a shield or cover extending over the gears to prevent material from lodging there, as well as serving as a guard to prevent the operator from getting his hands in the gear. This shield also provides for the segment with notches adapted to be engaged by the lever-pawl 69 and, furthermore, receives studs for idler-rollers 84 and bearings for shaft 82, and the sides 77 77' contain guideways or openings for the slides 79, which openings are closed at the top by means of an arch 121, which arch serves to unite the walls of the guideways and strengthen the castings. Said sides 77 77' also contain the recesses 115, with the lower openings 118. These sides furthermore have beds to receive the front steel or guard plate 90, which preferably is provided with an upwardly-extending arch which serves to unite the two sides, forming a rigid bridge-work at the discharge end of the feed-cutter head, and, lastly, the sides 77 77' form beds to receive the side walls 109 for the shield 110, which combination forms a rigid breastwork in uniting the two sides, said shield 110 gradually declining toward the upper roller and containing the upper bearings for the vertical rollers 89.

What I claim as my invention is—

1. In a feed-cutter, the combination of a frame, feed-rollers mounted therein, cutting mechanism adapted to cut the material advanced by the feed-rolls, a shaft to be driven, said shaft having a disk or member mounted thereon, which disk or member is provided on one face with conical projections arranged circularly therearound, a main shaft on a plane intersecting the plane of the driven shaft, a worm-wheel on the main shaft, said wheel provided with outstanding beveled ribs or guides, parallel portions of said ribs or guides describing an arc of a circle of which the shaft is the center or axis, and other parallel portions of said ribs or guides continuing at oblique angles to the first-referred-to ribs or guides, and said ribs or guides being of such varying thicknesses both at their base and outer edge as to permit them to conform to the varying spaces between the conical projections due to the circular arc described by the conical projections in their rotation, and as determined by parallel vertical lines drawn through the axes of the conical projections, and gearing between the driven shaft and the feed-rolls.

2. In a feed-cutter, the combination of a frame, a main rotatable shaft, cutting mechanism mounted on said shaft, another shaft disposed at an angle to the first-named shaft, bearing boxes or sleeves through which the said latter shaft loosely passes, one of said sleeves (75) provided with projecting pivots or pins, and located in the side 77, the other sleeve (74) being slidably mounted and located in the opposite side 77', a pinion mounted on said latter shaft, a gear-wheel with which the pinion meshes, a rod 73 having a threaded connection with the sliding sleeve 74, and a lever 67 connected to said rod 73 and adapted when operated to thrust the pinion into and out of meshing engagement with the gear-wheel.

3. In a feed-cutter, the combination, of a frame, a shaft having a pinion mounted thereon, means for driving the shaft, bearing-sleeves through which the shaft loosely passes, one of said sleeves provided with projecting pivots or pins adapted to turn in suitable recesses therefor in the side 77, a rod connected to the other bearing-sleeve, a gear-wheel with which the pinion meshes, feed-rollers, a gearing between said gear-wheel and the axes of the feed-rollers, and a lever connected to the rod and adapted when operated to thrust the pinion into or out of engagement with the gear-wheel.

4. In a feed-cutter, the combination, of a frame, a shaft having a pinion mounted thereon, means for driving the shaft, bearing-sleeves through which the said shaft loosely passes, one of said sleeves provided with projecting pivots or pins adapted to turn in suitable recesses therefor in the side 77, a rod having a threaded connection with the other bearing-sleeve, a gear-wheel with which the pinion meshes, feed-rollers, a gearing between said gear-wheel and the axes of the feed-rollers, and a lever connected to the rod and adapted when operated to thrust the pinion into or out of engagement with the gear-wheel.

5. In a feed-cutter, the combination, of a shaft having a pinion mounted thereon, means for driving the shaft, bearing-sleeves through which said shaft loosely passes, one of said sleeves provided with projecting pivots or pins adapted to turn in suitable recesses therefor in the side 77, a rod connected to the other bearing-sleeve, a gear-wheel with which the pinion meshes, feed-rollers, a gearing between said gear-wheel and the axes of the feed-rollers, a lever connected to the rod, and adapted when operated to thrust the pinion into or out of engagement with the gear-wheel, a spring-pressed dog pivotally connected to the handle portion of said lever, and a segment having notches in the curved edge thereof, said dog, when pressed inwardly against the action of the spring, adapted to be disengaged from one notch of the segment, and the lever to be thereby turned by the force of the gearing, until the dog is brought into position to engage the other notch of the segment.

6. The combination of a movable feed-roller, bars in which the axes of said feed-roller are mounted, said bars provided along one edge with teeth forming racks, wheels bearing against the edges of the bars which are opposite to the toothed edges thereof, a shaft having pinions thereon and engaging the racks, and a lever connected to said shaft and adapted to raise or lower the movable feed-roller at will of the operator.

7. The combination with feed-rollers provided with peripherally-projecting knives, and mechanism for operating the same, of ledger-plates arranged adjacent to the feed-rollers and provided with edged slits to permit the projecting knives of the rollers to pass therethrough and cut, split, or shear off the material, substantially as set forth.

8. The combination of feed-rollers provided with peripherally-projecting knives, bars in which the axis of one of the feed-rollers is mounted, means for raising and lowering said bars, a hood connected to the bars and extending over the rollers, and an edged ledger-plate connected to the hood, said ledger-plate having edged slits adapted to permit the projecting knives of the roller to pass through in slitting or shredding the material, substantially as set forth.

9. The combination, of feed-rollers, bars in which the axis of one of the feed-rollers is mounted, a shaft, a connection between said shaft and the bars, whereby as the shaft is turned, the bars are raised or lowered, a curved segmental arm extending from the shaft, a chain or flexible device arranged adjacent to the curved edge of the segmental arm, and a weight secured to said chain or connection.

10. The combination, of feed-rollers, bars in which the axis of one of the feed-rollers is mounted, a shaft, a connection between said shaft and the bars, whereby as the shaft is turned the bars are raised or lowered, a lever extending from said shaft, a curved segmental arm depending from the shaft, a chain or flexible connection arranged adjacent to the curved edge of the segmental arm, and a weight connected to said chain or connection.

11. The combination, of feed-rollers, bars in which the axis of one of the feed-rollers is mounted, a shaft, a connection between said shaft and the bars, whereby when said shaft is turned the bars are raised or lowered, a curved segmental arm depending from the shaft, a chain or flexible device arranged adjacent to the curved edge of the segmental arm, and a weight connected to the chain or connection, said weight being in the form of a mallet.

12. The combination, of a frame, feed-rollers journaled therein, a hood arranged over the passage in advance of the feed-rollers, the top of said hood gradually converging toward the feed-rollers, and perpendicular rollers in the passage in advance of the feed-rollers, the top of said hood forming the upper bearings for said perpendicular rollers.

13. In a feeder and cutter, the combination of rollers arranged adjacent to each other, and with a space therebetween and having a series of cutting-knives arranged circularly therearound, one of said rollers being yieldingly mounted, and adapted to shred the material longitudinally as it is fed therethrough.

14. The combination of a frame having recesses in its opposite sides, feed-rollers journaled in the frame, and perpendicular rollers fitting in said recesses, in advance of the feed-rollers, the lower ends of the perpendicular rollers being journaled in openings at the lower ends of the recesses.

15. In a feed-cutter, the combination of a frame, feed-rolls mounted therein, cutting mechanism adapted to cut the material as it is advanced by the feed-rolls, a shaft to be driven, said shaft having a disk or member mounted thereon, which disk or member is provided on one face with conical projections arranged circularly therearound, said conical projections consisting of conical rollers rotatably mounted on pins extending from the face of the disk or member, a main shaft on a plane intersecting the plane of the driven shaft, a worm-wheel on the main shaft, said wheel provided with outstanding beveled ribs or guides, parallel portions of said ribs or guides describing an arc of a circle of which the shaft is the center or axis, and other parallel portions of said ribs or guides continuing at oblique angles to the first-referred-to ribs or guides, and said ribs or guides being of such varying thicknesses both at their base and outer edge as to permit them to conform to the varying spaces between the conical projections due to the circular arc described by the conical projections in their rotation, and as determined by parallel vertical lines drawn through the axes of the conical projections, and a gearing between the driven shaft and the feed-rolls.

16. In a feed-cutter, the combination of a frame, feed-rolls mounted therein, cutting mechanism adapted to cut the material advanced by the feed-rolls, a shaft to be driven, said shaft having a disk or member mounted thereon, which disk or member is provided on one face with conical projections arranged circularly therearound, a main shaft on a plane intersecting the plane of the driven shaft, a worm-wheel mounted on the main shaft, said wheel provided with outstanding beveled ribs or guides, parallel portions thereof arranged spirally around the shaft, and said ribs or guides being of such varying thicknesses both at their base and outer edge as to permit them to conform to the varying spaces between the conical projections due to the circular arc described by the conical projections in their rotation, and as determined by parallel vertical lines drawn through the axes of the conical projections, and a gearing between the driven shaft and the feed-rolls.

In testimony whereof I affix my signature in presence of two witnesses.

FRANK HAMACHEK.

Witnesses:
   Jos. H. Janda,
   Frank J. Stangel.